(12) United States Patent
Gilpatrick et al.

(10) Patent No.: US 7,958,710 B2
(45) Date of Patent: Jun. 14, 2011

(54) LAWN MOWER BLADE COUPLING SYSTEM

(75) Inventors: Richard J. Gilpatrick, Whitewater, WI (US); Ryan Jaskowiak, Mukwonago, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 12/493,026

(22) Filed: Jun. 26, 2009

(65) Prior Publication Data
US 2010/0326034 A1 Dec. 30, 2010

(51) Int. Cl.
*A01D 34/03* (2006.01)
(52) U.S. Cl. ........................................ 56/17.5
(58) Field of Classification Search ............... 56/255, 56/295, 17.5, 12.7, 11.7; 403/2, 260, 353; 464/32, 33, 30, 42
See application file for complete search history.

(56) References Cited

U.S. PATENT DOCUMENTS

| | | | |
|---|---|---|---|
| 4,586,257 A | 5/1986 | Rittenhouse | |
| 4,712,364 A | 12/1987 | Oxley | |
| 5,456,095 A * | 10/1995 | Tawil et al. | 63/29.1 |
| 6,205,755 B1 | 3/2001 | Bontrager et al. | |
| 6,777,846 B2 | 8/2004 | Feldner et al. | |
| 7,124,566 B2 * | 10/2006 | Treger et al. | 56/295 |
| 7,200,982 B2 | 4/2007 | Vandyke | |
| 7,264,069 B2 | 9/2007 | Fiorenza et al. | |

* cited by examiner

*Primary Examiner* — Robert E Pezzuto
(74) *Attorney, Agent, or Firm* — Foley & Lardner LLP

(57) ABSTRACT

A rotary lawn mower includes an internal combustion engine having a power take-off. The mower further includes a connector adaptor attached to the power take-off, and a lawn mower blade. A connector base of the mower is attached to the blade. The connector base and the connector adaptor have extensions designed to interlock the connector base with the connector adaptor. At least one of the extensions forms a J-shaped structure arranged longitudinally along an axis of rotation of the connector base and connector adaptor.

20 Claims, 5 Drawing Sheets

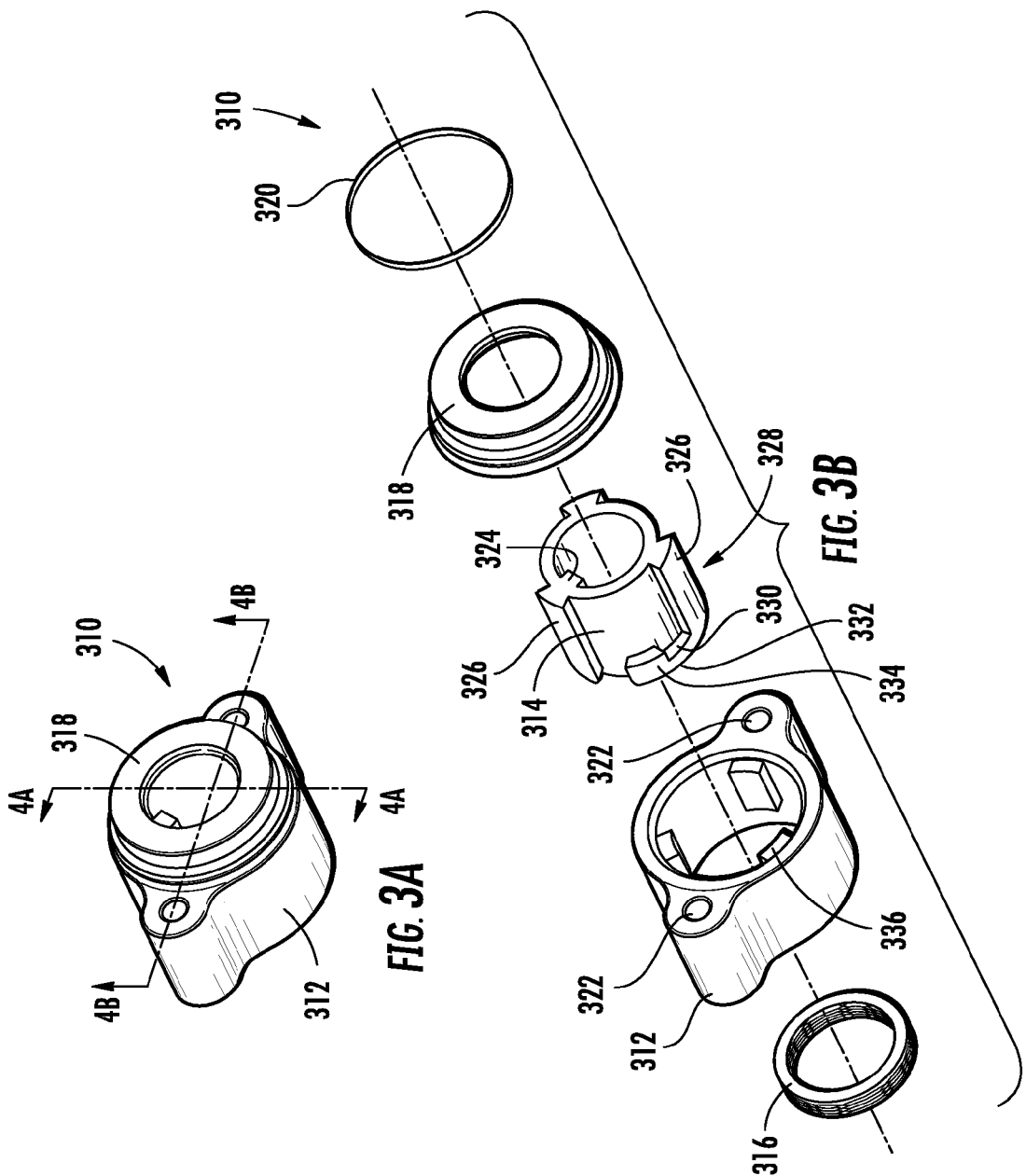

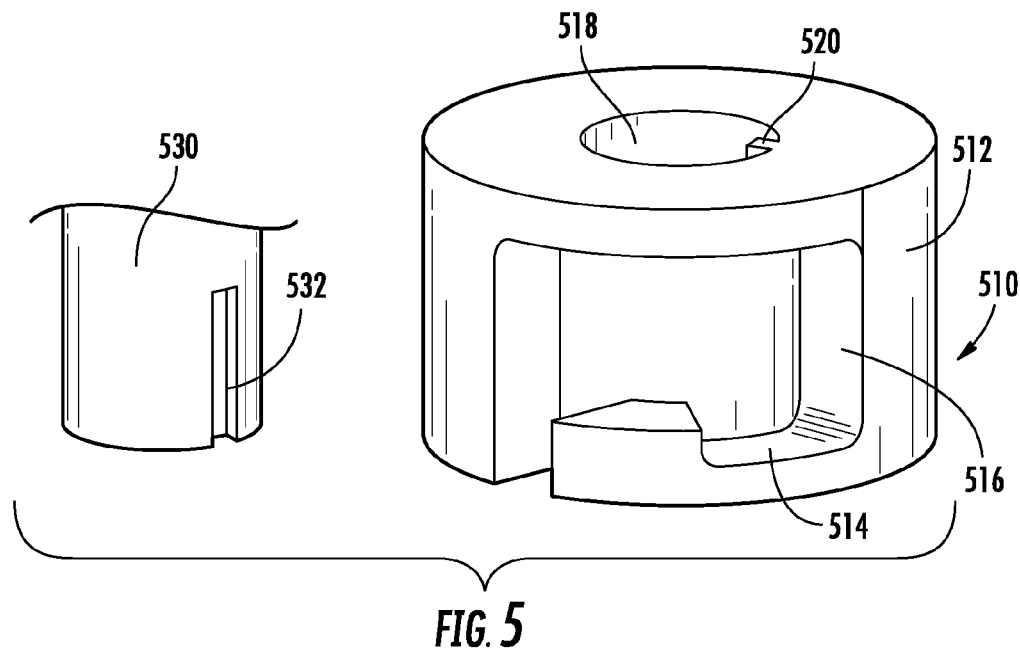
FIG. 5
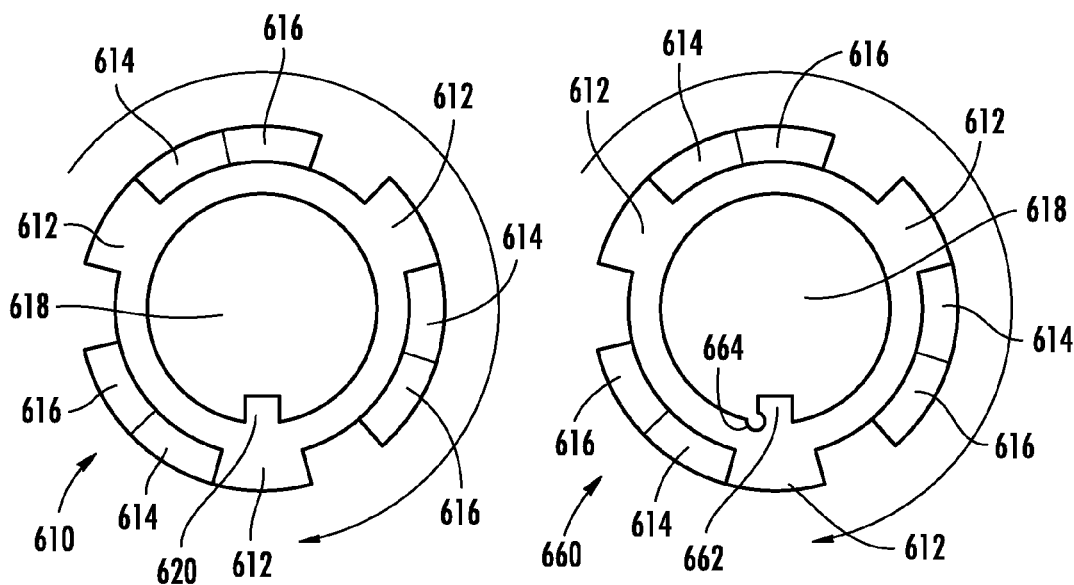
FIG. 6A
FIG. 6B

LAWN MOWER BLADE COUPLING SYSTEM

BACKGROUND

The present invention relates generally to the field of rotary lawn mowers. More specifically the present invention relates to a system for coupling a lawn mower blade to a combustion engine.

Cutting a lawn with a dull mower blade may damage a lawn, because a dull blade tends to tear rather than slice grass. Tearing exposes the grass to sun damage and lawn diseases. Additionally, tearing may require more energy than slicing. As such, rotary lawn mower blades should be sharpened from time to time so that they produce a clean and efficient cut.

Sharpening a mower blade typically requires removing the blade from the mower. Blade removal involves disconnecting the spark plug, and possibly removing gas and oil from the engine to prevent leaking. The mower is positioned so that the underside is accessible. The blade is then locked in a set position with a wedge or a block. A wrench or ratchet may then be used to remove nuts or bolts holding the blade to the mower body. Following sharpening, the blade is reattached, which typically requires the use of a wrench or ratchet to tighten the nuts or bolts holding the blade to the body of the mower.

SUMMARY

One embodiment of the invention relates to a rotary lawn mower that includes an internal combustion engine having a power take-off. The mower further includes a connector adaptor attached to the power take-off, and a lawn mower blade. A connector base of the mower is attached to the blade. The connector base and the connector adaptor have extensions designed to interlock the connector base with the connector adaptor. At least one of the extensions forms a J-shaped structure arranged longitudinally along an axis of rotation of the connector base and connector adaptor.

Another embodiment of the invention relates to a blade coupling system for a rotary lawn mower. The system includes a first connector having an extension and a second connector having a pocket with at least two sides. One of the pocket sides is longer than the other. The longer side serves as a backstop to hold the extension in the pocket when the connectors are in a locked position. The system further includes a spring for biasing the connectors in the locked position. One of the first and the second connectors is designed to be attached to a lawn mower blade and the other is designed to be attached to a power-take off of a combustion engine. Locking occurs when the connectors slide together compressing the spring, and the connectors are oriented so as to position the extension within the pocket.

Yet another embodiment of the invention relates to an adaptor for coupling an engine power take-off to a powered tool. The adaptor includes an opening through which a shaft of a power take-off may be inserted, and a key to engage a keyway of the power take-off. The key in the keyway rotationally couples the adaptor to the power take-off. Additionally the key is designed to disengage the keyway when a threshold force between the key and keyway is exceeded. The key disengages the keyway by at least one of two ways. Either the key tears free from the adaptor along a weakened portion of the key, or the key pushes into a wall of the adaptor.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which:

FIG. 3A is a perspective view of a coupling system according to an exemplary embodiment.

FIG. 3B is an exploded perspective view of the coupling system of FIG. 3A.

FIG. 5 is a perspective view of a connector adaptor for a coupling system according to an exemplary embodiment.

FIG. 6A is a top view of a connector adaptor for a coupling system according to another exemplary embodiment.

FIG. 6B is a top view of a connector adaptor for a coupling system according to yet another exemplary embodiment.

DESCRIPTION OF THE EXEMPLARY EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
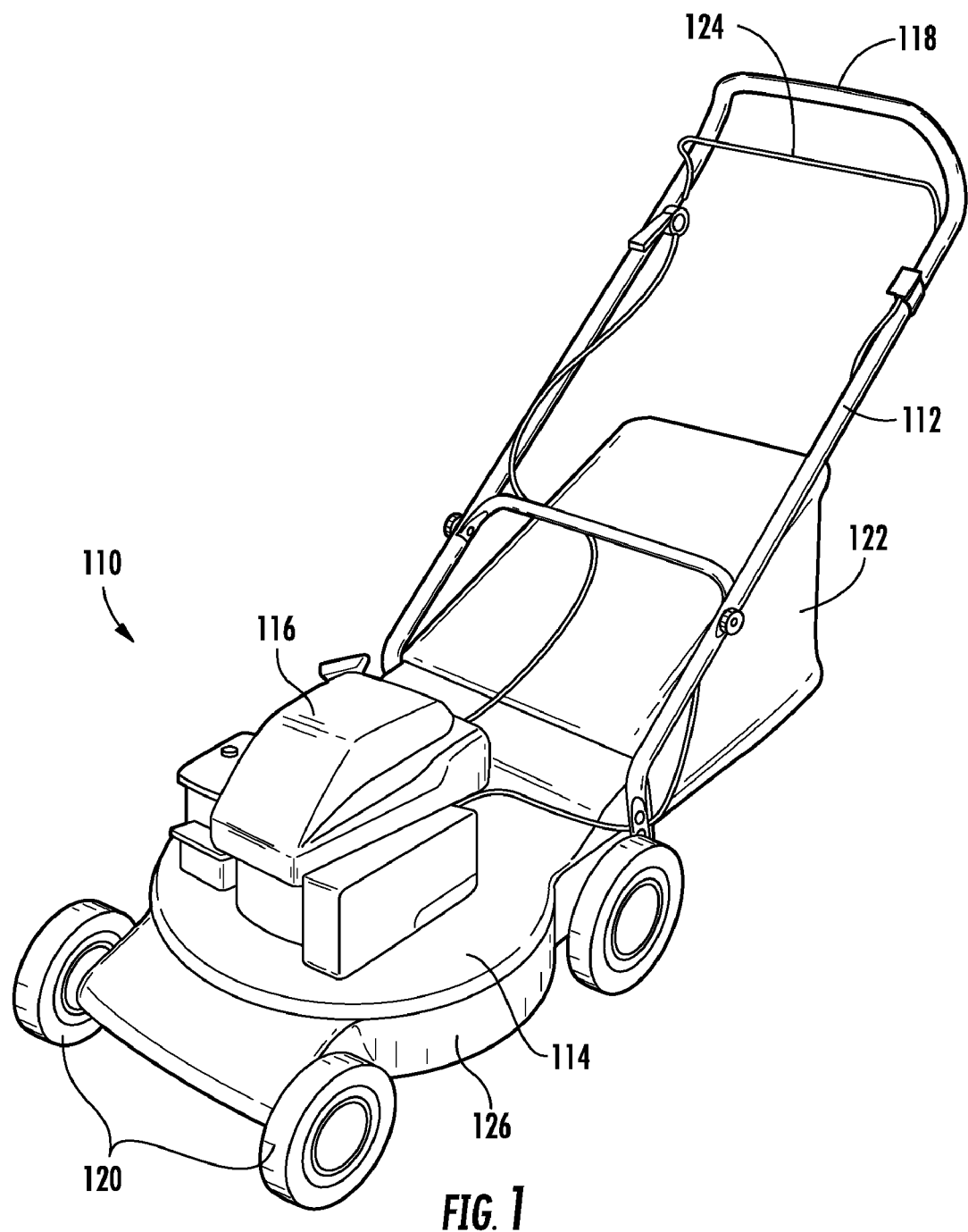
FIG. 1 is a perspective view of a rotary lawn mower according to an exemplary embodiment.

FIG. 1 shows a rotary lawn mower 110. The lawn mower 110 includes a frame 112 coupled to a deck 114 supporting an engine 116. Wheels 120 are coupled to the deck 114 and a handle 118 allows a user to push the rotary lawn mower 110. When operating, the lawn mower 110 cuts grass, the clippings of which are either mulched or directed to a collection bag 122 fastened to the rear of the deck 114. In some embodiments, the lawn mower 110 additionally includes a drive system coupled to the wheels 120, where a control bar 124 allows the user to engage and disengage the drive system. A skirt 126 extends from the deck 114 to surround a blade 212 (see FIG. 2).

While FIG. 1 shows the rotary lawn mower 110, some embodiments include driving lawn mowers, lawn mowers with multiple blades, lawn mowers without a drive system, and other lawn mowers. Other embodiments include other forms of power equipment, such as street sweepers, floor buffers, waxers, rotary scrubbers, and other power equipment with powered tools coupled to an engine or electric motor shaft.

Figure 2:
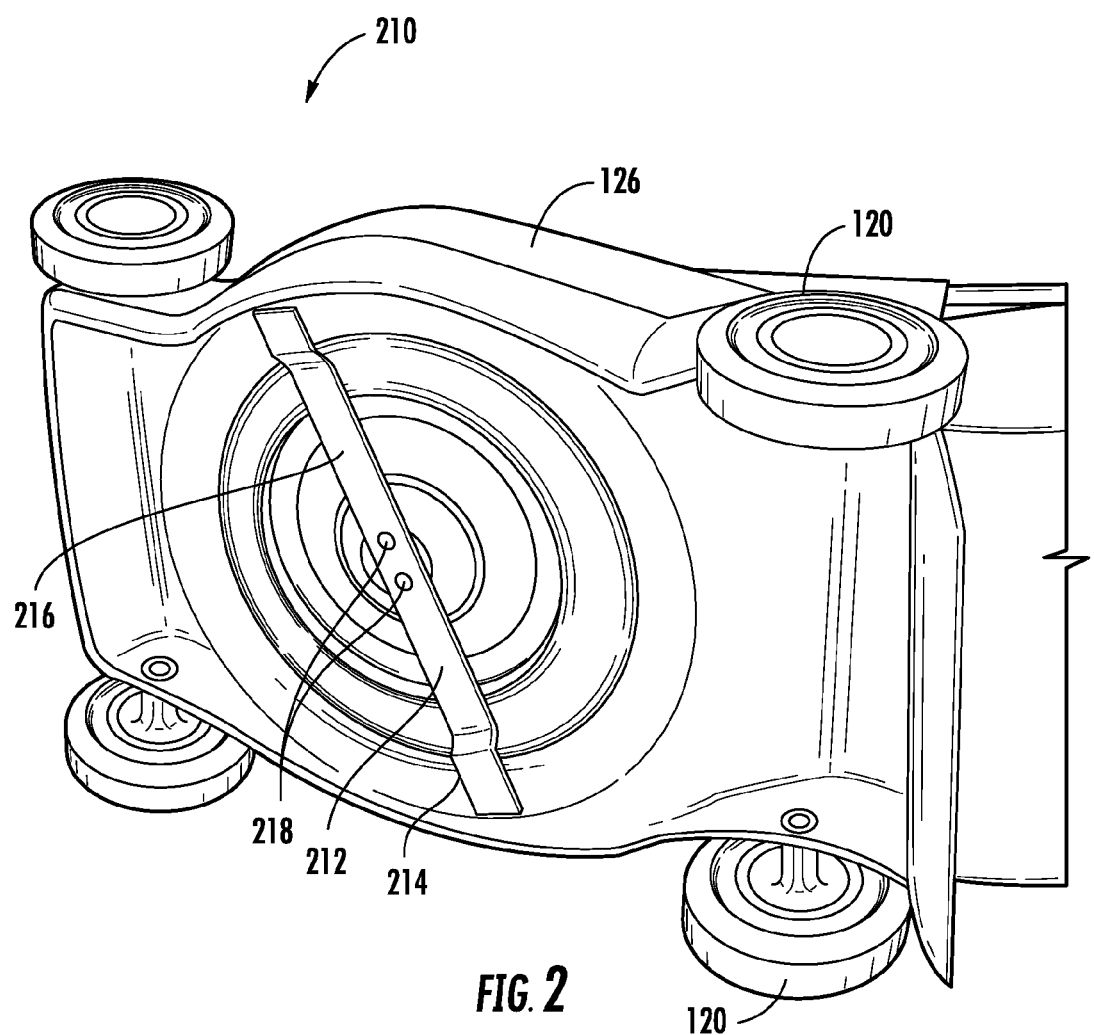
FIG. 2 is a perspective view of the underside of the lawn mower of FIG. 1.

FIG. 2 shows an underside 210 of the lawn mower 110, including the blade 212 with a cutting edge 214 and a blade shaft 216. The blade shaft 216 is coupled to the engine 116 by way of a blade coupling system. Due to the angle of the blade shaft 216, as the blade 212 spins within the skirt 126, an updraft is created which carries the grass clippings to the bag 122. The blade 212 is fastened to the blade coupling system with fasteners 218, such as threaded fasteners including nuts and bolts, screws, etc. In other embodiments, the blade 212 is fastened to the blade coupling system with other types of fasteners, such as glue, welds, hooks, latches, pins, tightening bars, or other fasteners.

FIGS. 3A and 3B show a blade coupling system according to an exemplary embodiment, the system in the form of a tool-less coupling system 310. FIG. 3A shows the coupling system 310 in an operational configuration, while FIG. 3B shows an exploded view of the coupling system 310. The coupling system 310 includes a connector base 312, a connector adaptor 314, and a biasing member, shown as a wave spring 316. Additionally, the coupling system 310 includes a bellow or dust cover 318 and a clamp 320. The connector base 312 is designed to attach to a standard lawn mower blade, such as to the blade shaft 216 of the blade 212, where fasteners 218 are inserted through both the blade shaft 216 and the bolt holes 322 of the connector base 312. The connector adaptor 314 is designed to attach to a power take-off (an example of which is shown in FIG. 5 as a power take-off 530) of a combustion engine or electric motor. For example, the power take-off 530 may slide into the connector adaptor 314 and be locked in place. The connector adaptor 314 further includes a key 324 on the inner wall surface. The key 324 is sized to slide into a corresponding keyway (see a keyway 532 in FIG. 5) notched in a power take-off.

The exterior surface of the connector adaptor 314, as shown in FIG. 3B, includes a spline or an extension 326 that extends longitudinally along the length of the connector adaptor 314, forming a portion of a J-shaped structure or hook 328 on the exterior surface of the connector adaptor 314. A well or pocket 330 of the hook 328 is formed by a second extension 332 that is arranged perpendicular to the extension 326. The second extension 332 is joined to a third extension 334 forming the shorter end of the hook 328. The width of the base of the hook 328 is sized to fit between mating extensions 336 within the interior of the connector base 312.

Figure 4B:
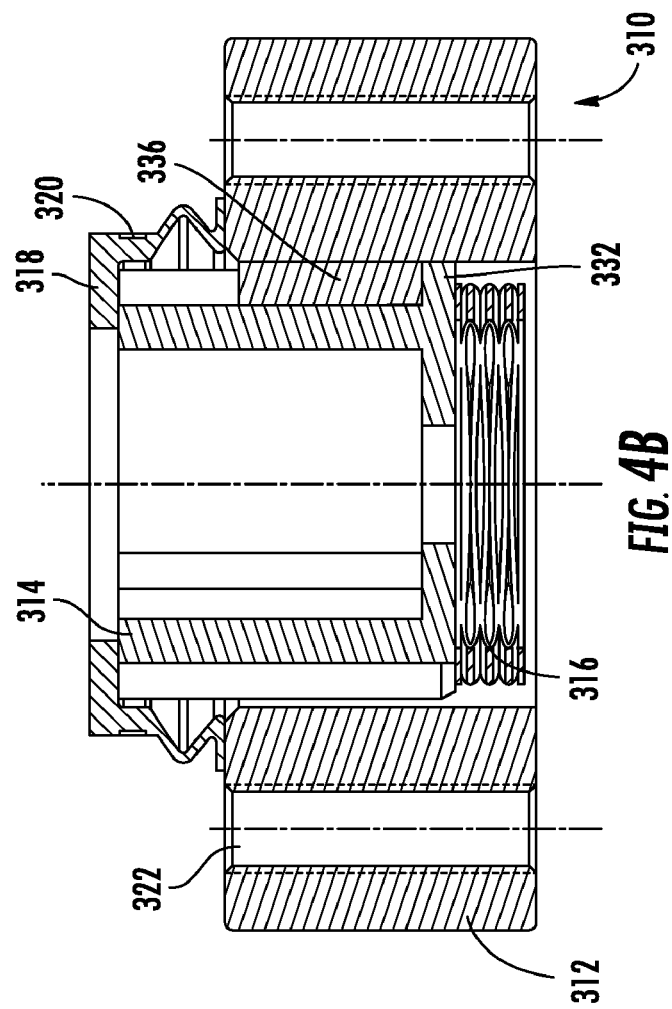
FIG. 4B is a sectional view taken generally along line 4B-4B of FIG. 3A.
Figure 4A:
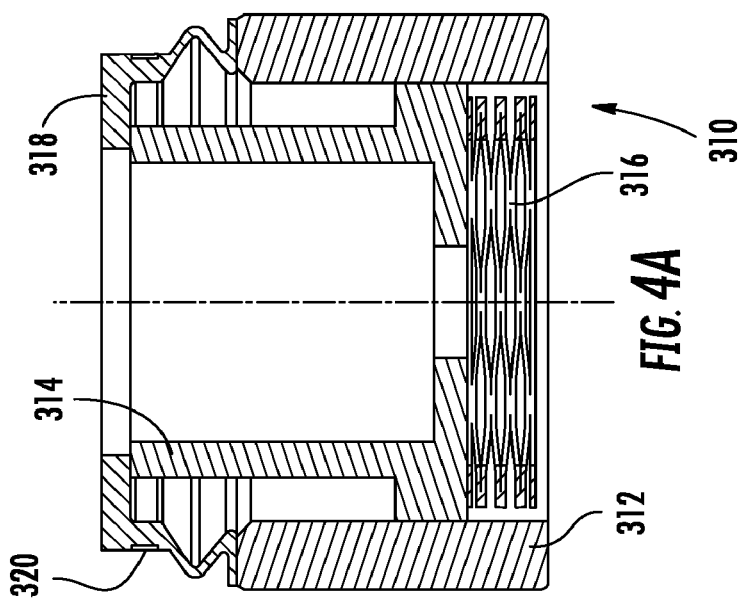
FIG. 4A is a sectional view taken generally along line 4A-4A of FIG. 3A.

Referring to FIGS. 4A and 4B, the connector base 312 surrounds the wave spring 316, which is positioned below the connector adaptor 314. The dust cover 318 is positioned over the top of the connector adaptor 314, and is bound to the outside surface of the connector adaptor 314 with the clamp 320. FIG. 4B shows interlocking extensions 332 and 336, where the wave spring 316 pushes the extension 332 (the bottom of the pocket 330 shown in FIG. 3B) into the extension 336 attached to the connector base 312. Still referring to FIG. 4B, bolt holes 322 are shown, through which bolts or other fasteners can be used to attach the blade 212 to the connector base 312.

When the connector base 312 is attached to the blade 212, the wave spring 316 is held within the connector base 312 between the blade shaft 216 and the extensions 336. The connector adaptor 314 is attached to a power take-off, with the dust cover 318 capping the attachment. From the underside 210 of the lawn mower 110, the connector base 312 and the blade 212 are slid onto the bottom of the connector adaptor 314, extending from the engine 116 through the deck 114. The hooks 328 of the connector adaptor 314 are slid between the spline extensions 336 of the connector base 312, and the bottom of the connector adaptor 314 (i.e., the underside of the J-shaped structure) compresses the spring 316. The connector adaptor 314 is then rotated relative to the connector base 312 such that the extension 336 of the connector base 312 is positioned either (1) on top of the shorter extension 334 or (2) within the pocket 330. Some of the compression loading of the spring 316 is then released to hold the extension 336 to the hook 328.

The hook 328 is designed to allow for placement of the extension 336 of the connector base 312 either on top of the shorter extension 334 of the connector adaptor 314 or within the pocket 330 in order to lock the coupling system 310 together. If the extension 336 is positioned within the pocket 330, the connector adaptor extension 326 will prevent the connector base extension 336 from passing over the hook 328. Alternatively, if the extension 336 is positioned on top of the shorter extension 334, not in the pocket 330, then when the lawn mower 110 is activated, the engine 116 will rotate the extension 336 of the connector base 312 into the extension 326 of the connector adaptor 314. The extension 326 of the connector adaptor 314 serves as a backstop to catch the extension 336 of the connector base 312. In short, rotation of the blade 212 will drive the coupling system 310 in to the locked position. In some embodiments, the extension 326 is curved, oblong, or otherwise shaped. For example, the hook 328 may be reverse-C-shaped or asymmetric V-shaped, instead of J-shaped.

In a preferred embodiment, the wave spring 316 is designed to be stiff enough to hold the connector base 312 and the connector adaptor 314 tightly in a locked position, while also pliable enough to allow a user to be able to compress the spring to attach and detach the coupling system 310.

In a preferred embodiment, the wave spring 316 is formed from seven turns, including 3.5 waves, the free height of the wave spring 316 is about 0.8 inches, the working height (i.e., recommended compression) is about 0.3 inches, and the height at maximum compression is approximately 0.2 inches. The spring rate is approximately forty pounds-force per inch, requiring approximately 20 pounds to compress the spring from free to working height. In other embodiments, such as those employing coil springs, the free height is greater than 0.8 inches. For example, in some embodiments, the free height ranges from 0.2 inches to 4 inches, preferably from 0.5 inches to 2 inches. In some embodiments, the spring rate varies from approximately five to two-hundred pounds-force per inch, and preferably from approximately twenty to eighty pounds-force per inch. In some embodiments, the force required to compress the spring, to allow for attachment or detachment, ranges from approximately five to fifty pounds. In other embodiments, various biasing members are used, such as a coil spring, flexible beams, or other biasing members. In still other embodiments, a damper is used in place of the spring 316. The damper resists movement in response to sharp or jarring jolts, such as the blade striking a rock.

In some alternate embodiments, the connector base may be sized to fit and slide within the connector adaptor, and the arrangement of the extensions are correspondingly reversed. In other embodiments, the connector adaptor and connector base are not cylindrical, but instead have square cross-sections, polygonal cross-sections, oval cross-sections, or other shapes. Some embodiments employ different numbers and positions of extensions. For example, some embodiments only include a single hook and corresponding extension in the connector base. In some embodiments, the extensions do not extend the full length of the connector adaptor.

As shown in FIGS. 4A and 4B, the dust cover 318 is a rubber sleeve sized to fit tightly on the top of the connector adaptor 314. The clamp 320 fits around the dust cover 318 to lock the dust cover in place. In other embodiments, the dust cover 318 slides onto the power take-off of the combustion engine. In some embodiments, the dust cover 318 is sized so that no clamp is necessary to secure the dust cover. The dust cover blocks debris, such as grass clippings from entering and collecting in the base of the engine 116, or in the spaces within the connector adaptor 314 and the connector base 312. In still other embodiments, the blade coupling system 310 does not include the dust cover 318.

FIG. 5 shows a connector adaptor 510 according to another exemplary embodiment. The connector adaptor 510 is designed to couple to a connector base, such as the connector base 312. The connector adaptor 510 includes an integral extension 512 forming a reverse-C shape. The integral extension 512 includes several components, such as a pocket 514, a backstop extension 516, and an upper flange integral with the backstop extension 516. The upper flange prevents a user from over-compressing the spring 316 by limiting movement of a mating extension in the connector base 312. Additionally, the connector adaptor 510 includes an aperture 518 for the power take-off 530 of a combustion engine, and a key 520 to engage the keyway 532 on the power take-off 530.

FIGS. 6A and 6B show top-down views of connector adaptors 610, 660 according to alternate exemplary embodiments. The connector adaptors 610, 660 include a backstop extension 612, a seat extension 614 for a pocket, similar to the pocket 330, and a hook-end extension 616. The connector adaptors 610, 660 further include an aperture 618 into which a power take-off of an engine or motor may extend. The connector adaptor 610 includes a key 620, while the connector adaptor 660 includes a key 662, both of which are sized to fit within a corresponding keyway of a power take-off.

The key 662 of the connector adaptor 660 includes a crack initiation site on a side of the key 662, where the key 662 attaches to the rest of the connector adaptor 660. As shown, the crack initiation site is in the form of a rounded cut 664. The crack initiation site is designed to withstand ordinary fatigue loading associated with engaging and disengaging the blade 212 during lawn mower 110 operation without crack propagation. However, if the lawn mower receives a sudden jolt or impulse that could damage the motor, then the key 662 is designed to sever, breaking the coupling between the power take-off and the connector adaptor 660. In other embodiments, the crack initiation site is a wedge cut, an oval cut, or other geometry cut. In still other embodiments, the crack initiation site is an area of reduced cross section of the key 662, not a cut. In yet other embodiments, the key is formed from a composite, where the crack initiation site is in the form of a secondary material with reduced toughness (i.e., resistance to fracture).

The construction and arrangements of the lawn mower blade coupling system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. In some embodiments, a key is used in adaptors not coupled to lawn mower blades, such as an adaptor for coupling an engine to a pump of a pressure washer. In other embodiments, a key may be a separate piece, not integral with either a base or an adaptor. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A blade coupling system for a rotary lawn mower, comprising:
    a first connector having an extension;
    a second connector having a pocket with at least two sides, one side longer than the other, the longer side serving as a backstop to hold the extension in the pocket when the connectors are in a locked position;
    a spring for biasing the connectors in the locked position; and
    a dust cover configured to block debris from entering and collecting in spaces within the first and second connectors;
    wherein one of the first and the second connectors is configured to be attached to a lawn mower blade and the other connector is configured to be attached to a power-take off of a combustion engine, and
    wherein locking occurs when the connectors slide together compressing the spring, and the connectors are oriented so as to position the extension within the pocket.

2. The system of claim 1, wherein the system is configured to allow a user to couple or decouple the connectors without removing or inserting threaded fasteners.

3. The system of claim 2, wherein a load ranging from approximately five to fifty pounds is sufficient to compress the spring to allow a user to rotate the extension relative to the pocket to attach or detach the first connector and the second connector.

4. The system of claim 3, wherein the connector that is attachable to the power-take off has a key to engage a keyway of the power-take off, wherein the key is configured to release the keyway when forces between the key and the keyway exceed a threshold amount.

5. The system of claim 3, wherein the spring is a wave spring.

6. The system of claim 4, wherein the key disengages the keyway by the key tearing free from the connector that is attachable to the power-take off along a weakened portion of the key.

7. The system of claim 6, wherein the weakened portion of the key comprises a crack initiation site at a base of the key.

8. The system of claim 7, wherein the crack initiation site comprises a round cut.

9. The system of claim 7, wherein the crack initiation site comprises a narrower portion of the key.

10. The system of claim 1, wherein the first and second connectors are only configured to be locked together by rotating the first connector relative to the second connector in a first direction, and are only configured to be unlocked from one another by rotating the first connector relative to the second connector in a second direction that is opposite to the first direction.

11. The system of claim 10, wherein the longer side of the second connector serves as a backstop such that if the extension of the first connector is placed on the top of the shorter side of the second connector instead of in the pocket before the power-take off is activated, then activation of the power take-off rotates the extension from the top of the shorter side toward the pocket and the longer side prevents over-rotation of the extension past the pocket, while the spring simultaneously biases the extension into the pocket for locking.

12. The system of claim 1, wherein the extension of the first connector and the pocket and shorter side of the second connector are respectively positioned such that the first and second connectors are configured to be coupled without having to slide the extension past the full length of the second connector while compressing the spring to lock the connectors.

13. A blade coupling system for a rotary lawn mower, comprising:
    a first connector having an extension;

a second connector having a pocket, a shorter side, and a longer side, wherein one of the first and the second connectors is configured to be attached to a lawn mower blade and the other of the first and the second connectors is configured to be attached to a power-take off of a combustion engine; and a spring, wherein locking occurs between the first and second connectors when the first and second connectors slide together compressing the spring, the first and second connectors rotate relative to one another so as to position the extension within the pocket, and the spring biases the connectors in a locked position;

wherein the longer side of the second connector serves as a backstop such that if the extension of the first connector is placed on the top of the shorter side of the second connector instead of in the pocket before the power-take off is activated, then activation of the power take-off rotates the extension from the top of the shorter side toward the pocket and the longer side prevents over-rotation of the extension past the pocket, while the spring simultaneously biases the extension into the pocket for locking.

14. The system of claim 13, further comprising:
a dust cover configured to block debris from entering and collecting in spaces within the first and second connectors.

15. The system of claim 13, wherein the spring is a wave spring, and wherein a load ranging from approximately five to fifty pounds is sufficient to compress the spring to allow a user to rotate the extension relative to the pocket to attach or detach the first connector and the second connector.

16. The system of claim 13, wherein the connector that is attachable to the power-take off has a key to engage a keyway of the power-take off, wherein the key is configured to release the keyway when forces between the key and the keyway exceed a threshold amount, wherein the key disengages the keyway by the key tearing free from the connector that is attachable to the power-take off along a weakened portion of the key, and wherein the weakened portion of the key comprises a crack initiation site at a base of the key.

17. The system of claim 13, wherein the extension of the first connector and the pocket and shorter side of the second connector are respectively positioned such that the first and second connectors are configured to be coupled without having to slide the extension past the full length of the second connector while compressing the spring to lock the connectors.

18. A blade coupling system for a rotary lawn mower, comprising:
a first connector having an extension;
a second connector having a pocket, a shorter side, and a longer side, wherein one of the first and the second connectors is configured to be attached to a lawn mower blade and the other of the first and the second connectors is configured to be attached to a power-take off of a combustion engine; and
a spring, wherein locking occurs between the first and second connectors when the first and second connectors slide together compressing the spring, the first and second connectors rotate relative to one another so as to position the extension within the pocket, and the spring biases the connectors in a locked position; and
wherein the extension of the first connector and the pocket and shorter side of the second connector are respectively positioned such that the first and second connectors are configured to be coupled without having to slide the extension past the full length of the second connector while compressing the spring to lock the connectors.

19. The system of claim 18, wherein the longer side of the second connector serves as a backstop such that if the extension of the first connector is placed on the top of the shorter side of the second connector instead of in the pocket before the power-take off is activated, then activation of the power take-off rotates the extension from the top of the shorter side toward the pocket and the longer side prevents over-rotation of the extension past the pocket, while the spring simultaneously biases the extension into the pocket for locking.

20. The system of claim 19, further comprising:
a dust cover configured to block debris from entering and collecting in spaces within the first and second connectors.

* * * * *